(12) United States Patent
Fukuzuka et al.

(10) Patent No.: US 6,231,747 B1
(45) Date of Patent: May 15, 2001

(54) STERILIZING WET WIPER AND APPARATUS FOR SUPPLYING STERILIZING WET WIPERS

(75) Inventors: Kunihiko Fukuzuka; Shinichi Nakamura, both of Osaka (JP)

(73) Assignee: T.R.P. Co., Ltd., Osaka (JP)

( * ) Notice: Subject to any disclaimer, the term of this patent is extended or adjusted under 35 U.S.C. 154(b) by 0 days.

(21) Appl. No.: 09/292,010

(22) Filed: Apr. 15, 1999

(30) Foreign Application Priority Data

Aug. 24, 1998 (JP) .................................................. 10-255954

(51) Int. Cl.⁷ ................................ C25B 1/26; C25B 9/00; A61L 2/02
(52) U.S. Cl. ........................ 205/500; 205/701; 204/278.5
(58) Field of Search ..................................... 204/232, 271, 204/278, 275.1, 237, 278.5; 205/500, 701

(56) References Cited

U.S. PATENT DOCUMENTS

| 2,882,210 | 4/1959 | Jenks ...................................... 204/151 |
| 3,062,732 | * 11/1962 | Keidel ................................ 204/278 X |
| 3,819,329 | * 6/1974 | Kaestner et al. .............. 204/275.1 X |
| 6,106,691 | * 8/2000 | Nakamura et al. ................... 205/701 |
| 6,113,853 | 9/2000 | Nakamura et al. . |

FOREIGN PATENT DOCUMENTS

| 0 243 846 | 11/1987 | (EP) . |
| 89/03809 | 5/1989 | (WO) . |

* cited by examiner

Primary Examiner—Donald R. Valentine
(74) Attorney, Agent, or Firm—Rader, Fishman & Grauer (57) ABSTRACT

An absorbent base material is impregnated with electrolyzed water containing hypohalogenous acid which is obtained by supplying water containing at least halogen ions between an anode plate and cathode plates and electrolyzing the water, whereby the occurrence of rough skin caused by a remaining liquid medicine and the like can be reduced or prevented.

22 Claims, 7 Drawing Sheets

STERILIZING WET WIPER AND APPARATUS FOR SUPPLYING STERILIZING WET WIPERS

BACKGROUND OF THE INVENTION

1. Field of the Invention

The present invention relates generally to a sterilizing wet wiper and in particular to a wet wiper that is excellent in a sterilizing property as well as a wet wiper that has a reduced adverse effect on a human body (such as rough skin) caused by contact with liquid medicine when the wet wiper is used for a long time. The present invention also relates to a sterilizing wet wiper supplying apparatus.

2. Description of Related Art

There have been used wet wipers composed of absorbent base materials such as paper, non-woven fabric, cotton wool, rayon staple cotton and these materials combined with a plastic film that are impregnated with water, alcohol, a sterilizing liquid medicine, perfume and the like. Such wet wipers are often referred to generically as "wet tissues", "small disposable damp towels", "hand wipers" and the like.

However, since these conventional sterilizing wet wipers are impregnated with a liquid medicine such as alcohol, benzalconium chloride, propylene glycol or the like, such liquid medicine does not generally decompose and is thus liable to remain on a subject being sterilized and/or treated or on a human body even though the medicine has partly volatized. As such, there arises a problem that the wet wipers cause rough skin and the like when they are used for a long time. Accordingly, there has been eagerly desired a sterilizing wet wiper by which an excellent sterilizing effect can be obtained without the same problem of liquid medicine remaining after application.

An object of the present invention made in view of the above problem and others is to provide a sterilizing wet wiper capable of achieving an excellent sterilizing effect without causing rough skin by residual liquid medicine and the like, as well as apparatus for dispersing and/or supplying a sterilizing wet wiper.

SUMMARY OF THE INVENTION

In accordance with these and other objects there is provided a sterilizing wet wiper of the present invention that comprises an absorbent base material impregnated with electrolyzed water containing hypohalogenous acid, wherein the electrolyzed water is by supplying water containing at least halogen ions between an anode plate and cathode plates and electrolyzing the water.

In further accordance with the present invention there is provided an apparatus for supplying sterilizing wet wipers comprising a device for creating electrolyzed water containing hypohalogenous acid, said device including a mechanism for supplying water containing at least halogen ions between an anode plate and cathode plates and electrolyzing the water; and an impregnation means for impregnating an absorbent base material with the electrolyzed water supplied from said electrolyzed water creating device.

Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENT

According to the above characteristic, the hypohalogenous acid in the electrolyzed water with which the absorbent base material is impregnated generally has a high sterilizing power at a low concentration. In addition, the hypohalogenous acid decomposes to water and halogen ions which are harmless to a human body and the like when they come into contact with them. Accordingly, even if the hypohalogenous acid is used for along time, it does not generally produce or lead to rough skin and the like or remain on the human body.

It is preferable in the sterilizing wet wiper of the present invention that the electrolyzed water have a hydrogen ion concentration (pH) of 5.8–8.6.

With this arrangement, since the pH of the electrolyzed water is set to an approximately neutral region of pH 5.8–8.6 (which is the reference pH of many service or tap waters) the stimulation of skin and the like caused by acidity or alkalinity can be reduced.

In the sterilizing wet wiper of the present invention, it is preferable that the halogen ions be composed of chlorine ions and bromine ions mixed at a prescribed mixing ratio.

With this arrangement, a stable and high sterilizing power can be obtained at the pH 5.8–8.6.

In the sterilizing wet wiper of the present invention, it is preferable that the water used to prepare the electrolyzing water be fresh water containing at least 5 ppm of chlorine ions and having a conductivity of 100 $\mu$s/cm or more.

With this arrangement, since ordinary tap or service water can be used without the need of additives or, replenishment with halogen ions, a sterilizing wet wiper can be supplied at a relatively low price.

A sterilizing wet wiper supply apparatus of the present invention comprises an electrolyzed water creating device for creating electrolyzed water containing hypohalogenous acid by supplying water containing at least halogen ions between an anode plate and cathode plates and electrolyzing the water, and an impregnation means for impregnating an absorbent base material with the electrolyzed water supplied from the electrolyzed water creating device.

According to a characteristic of the invention, since the hypohalogenous acid in the electrolyzed water with which the absorbent base material is impregnated generally has a high sterilizing power at a low concentration as well as decomposes to water and halogen ions which are harmless to a human body and the like when they come into contact with them, the hypohalogenous acid does not remain on the human body or other object which is sterilized by the wet wiper. Accordingly, there can be supplied a sterilizing wet wiper which is resistant to rough skin or other negative effects since the hypohalogenous acid does not remain on the human body even if it is used for a long time.

In the sterilizing wet wiper supply apparatus of the present invention, it is preferable that the absorbent base material is impregnated with the electrolyzed water just before it is supplied to the outside of the apparatus. With this arrangement, it is preferable to impregnate the absorbent base materials with the electrolyzed water one after another in response to requests for supplying sterilizing wet wipers. This is particularly relevant because the hypohalogenous acid in the electrolyzed water decomposes as time elapses after the electrolyzed water comes into contact with air. Thus by impregnating the base material shortly before dispensing, the concentration of electrolyzed water needed is kept to a minimum. According to this means, there can be supplied a sterilizing wet wiper having a high hypohalogenous acid concentration, whereby an excellent sterilizing power can be obtained. The hypohalogenous acid is preferably present in the water in an amount of at least 1 ppm, most preferably 20–500 ppm.

It is preferable that the sterilizing wet wiper supplying apparatus of the present invention comprises a pH maintaining means for maintaining the pH of the electrolyzed water to 5.8–8.6. With this arrangement, since the pH of the electrolyzed water with which the absorbent base material is impregnated is preferably in the neutral region of 5.8–8.6 at all times or at least when dispensed, the stimulation of skin and the like caused by acidity and alkalinity can be reduced.

In the sterilizing wet wiper supplying apparatus of the present invention, it is preferable that at least an anode in the electrolyzed water creating device be composed of ferrite and the electrolyzed water creating device has a service water supply port capable of supplying service water such as tap water and the like.

With this arrangement, ferrite has sufficient durability even if a high voltage is imposed thereon and can directly electrolyze service water and the like having low conductivity without the addition of halogen ions and produce electrolyzed water containing hypohalogenous acid.

In the sterilizing wet wiper supplying apparatus of the present invention, it is preferable that the electrolyzed water creating device has a circulation passage to permit the service water to be electrolyzed at least two times and even a plurality of times such as 3, 10 4, 5, 10, 100 or even more times.

With this arrangement, electrolyzed water containing highly concentrated hypohalogenous acid can be made by executing electrolysis a plurality of times.

In the sterilizing wet wiper supplying apparatus of the present invention, it is preferable that the absorbent base material is a rolled continuous sheet. With this arrangement, not only a large amount of the absorbent base material can be accommodated but the use of sheet material also permits only the portion of the base material being supplied to be effectively impregnated with the electrolyzed water.

Any device capable of impregnating a base material with electrolyzed water can be used to impregnate the base material.

In the sterilizing wet wiper supplying apparatus of the present invention, it is preferable that the impregnation means comprise a base material supply unit capable of supplying a continuous sheet-shaped base material at an approximately constant speed and a supply nozzle for discharging the electrolyzed water supplying from the electrolyzed water creating device to the base material in an approximately constant discharge amount. With this arrangement, the entire base material being supplied can be approximately uniformly impregnated with an approximately prescribed amount of the electrolyzed water by a simple mechanism. Suitably, 10–15 ml of the electrolyzed water can be employed if the acid concentration is in the neighborhood of 200 ppm.

It is preferable that the sterilizing wet wiper supplying apparatus of the present invention also comprise a read/write unit for reading numeric data corresponding to the remaining capability of the apparatus to supply wet wipers. Such data can be based for example, on a particular individual's proscribed allotment of wipers over a given time or on any factor desired. The numeric data is preferably obtained from a portable recording medium. The apparatus also suitably includes determination means for determining whether a sterilizing wet wiper can be supplied or not based on the numeric data and subtraction means for subtracting a prescribed numeric value from the numeric data each time a sterilizing wet wiper is supplied, such that renewed numeric data is obtained by subtracting a prescribed numeric value and the renewed numeric data is stored to the recording medium.

With this arrangement, since only a person having a recording medium in which a prescribed remaining numeric data is stored can be supplied with a sterilizing wet wiper, a sterilizing wet wiper is not supplied unnecessarily. It is preferable that the sterilizing wet wiper supplying apparatus of the present invention also comprise a proximity sensor disposed in the vicinity of a supply port through which the absorbent base material is supplied to sense the approach of a human body or other object which accepts a wet wiper.

With this arrangement, a sterilizing wet wiper can be automatically supplied when the proximity sensor senses the approach of a hand or other object.

Embodiments of the present invention will be described below with reference to the drawings. (Embodiment 1)

Figure 1:
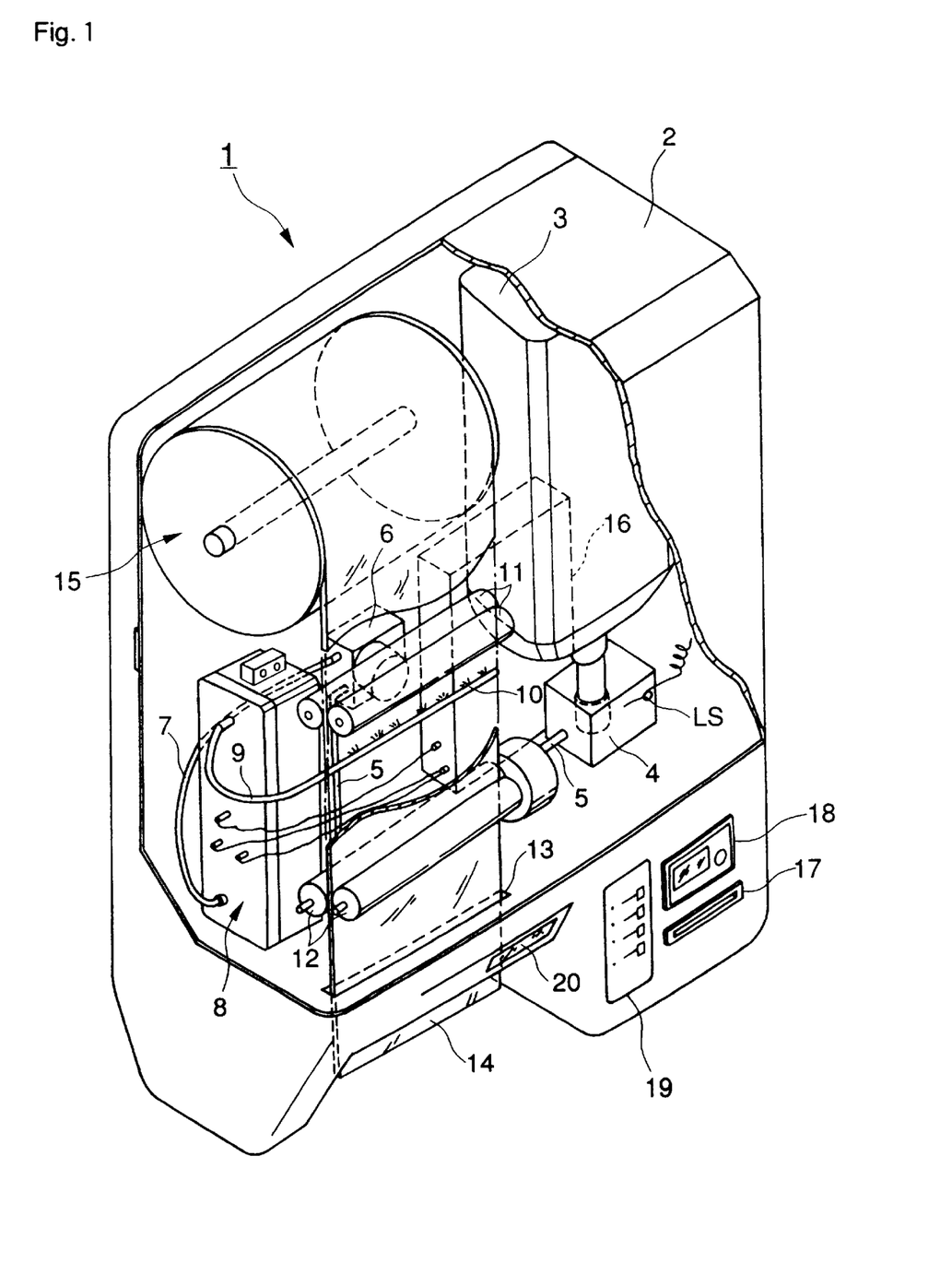
FIG. 1 is a perspective view, partly in cross section, showing an arrangement of a sterilizing wet wiper supplying apparatus in an embodiment of the present invention.
Figure 2:
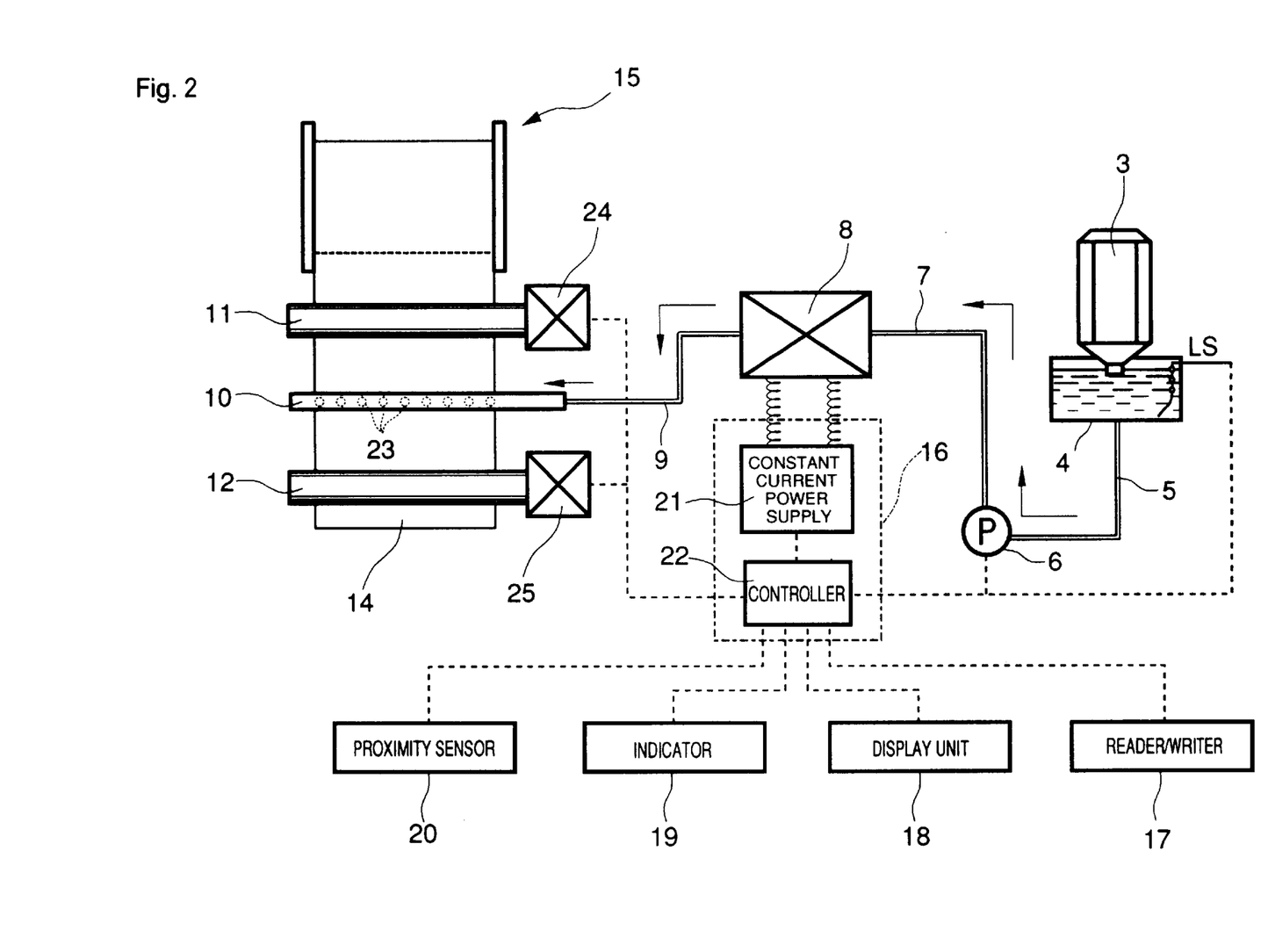
FIG. 2 is a flow and block diagram showing an arrangement of the sterilizing wet wiper supplying apparatus in an embodiment of the present invention.
Figure 3:
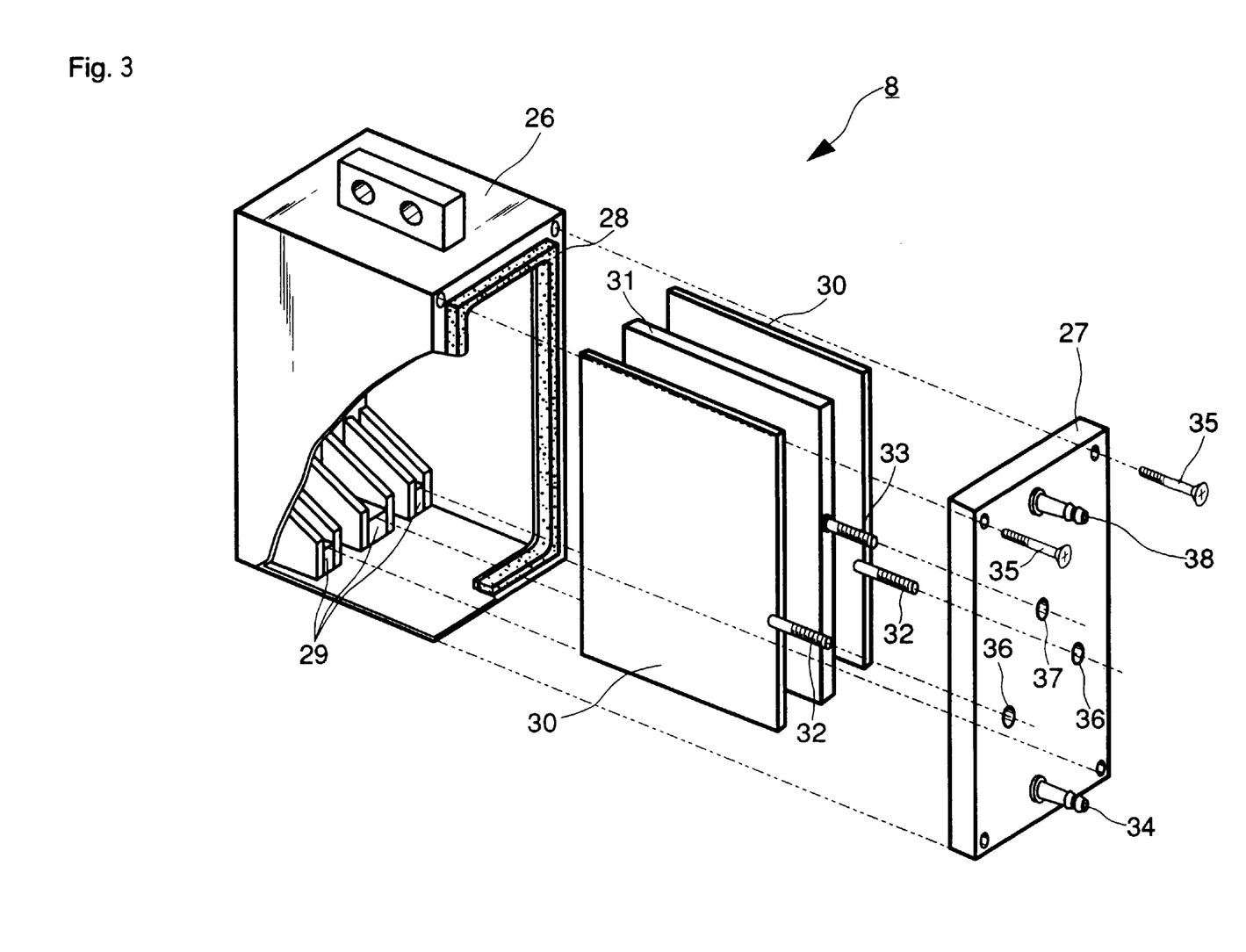
FIG. 3 is a perspective view, partly in cross section, showing an arrangement of an electrolyzer used to the sterilizing wet wiper supplying apparatus in an embodiment of the present invention.
Figure 4:
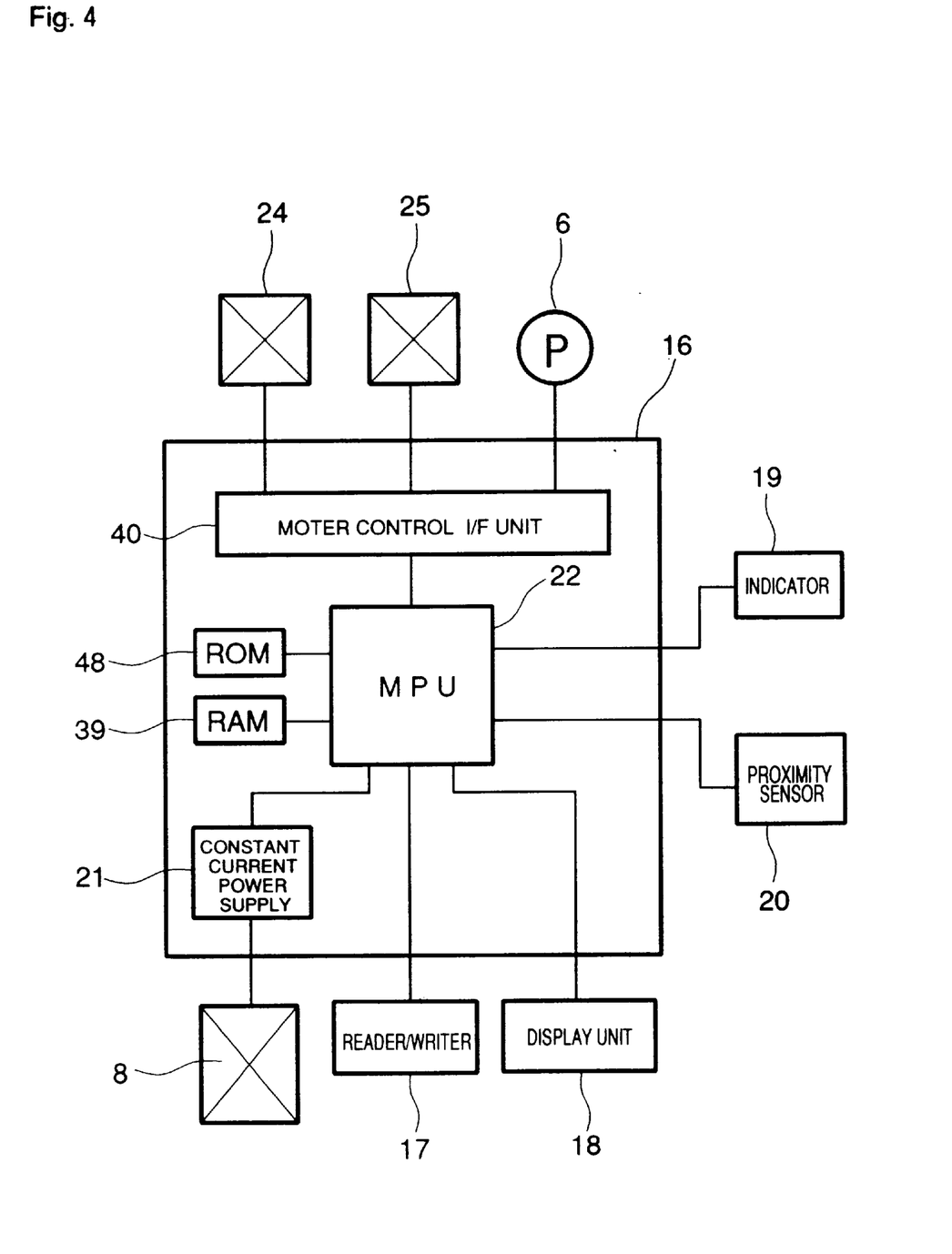
FIG. 4 is a block diagram showing an arrangement of a controller used to the sterilizing wet wiper supplying apparatus in an embodiment of the present invention.

FIG. 1 is a perspective view, partly in cross section, showing an arrangement of a sterilizing wet wiper supplying apparatus in an embodiment 1 of the present invention, FIG. 2 is a flow and block diagram showing an arrangement of the sterilizing wet wiper supplying apparatus in the embodiment 1 of the present invention, FIG. 3 is a perspective view, partly in cross section, showing an arrangement of an electrolyzer used to the sterilizing wet wiper supplying apparatus in the embodiment 1 cf the present invention, and FIG. 4 is a block diagram showing an arrangement of a controller used to the sterilizing wet wiper supplying apparatus in the embodiment 1 of the present invention.

As shown for example in FIG. 1, the sterilizing wet wiper supplying apparatus 1 of the embodiment 1 is preferably arranged such that there are disposed, in the interior of a cover 2 which detachably covers the front surface of the apparatus, an electrolyte aqueous solution bottle 3 for storing an electrolyte aqueous solution which contains halogen ions of a prescribed concentration obtained by dissolving a halide of a prescribed concentration such as sodium chloride, sodium bromide and the like as well as has suitable conductivity and is set to a neutral region of pH 5.8–8.6, a receiving pail provided with a level sensor LS for temporarily storing the electrolyte aqueous solution supplied from the electrolyte aqueous solution bottle 3, a fixed quantity discharge pump 6 communicating with the receiving pail 4 through a flow passage 5 for supplying the electrolyte aqueous solution discharged to an electrolyzer 8 through a flow passage 7 while regulating its flow rate to a constant flow rate, the electrolyzer 8 for electrolyzing the electrolyte aqueous solution fed from the flow passage 7, a supply nozzle 10 for discharging and supplying the electrolyte aqueous solution (which has been made to electrolyzed water with hypohalogenous acid created therein by the electrolyzer 8) to a continuous sheet-shaped absorbent base material 14 through a flow passage 9, a supply drum 15 for supplying the continuous sheet-shaped absorbent base material 14 arranged as a roll, a pair of guide rollers 11, 12 disposed above and below the supply nozzle 10 for drawing out the absorbent base material 14 from the supply drum 15 and causing it to travel in front of the discharge ports 23 of the supply nozzle 10, and a controller 16 for controlling the operation of the apparatus as a whole.

Numeral 13 in FIG. 1 denotes a discharge port for discharging the continuous absorbent base material 14 impregnated with the electrolyzed water therethrough.

A reader/writer 17 into which a user can insert a prepaid card (not shown), a display unit 18 for displaying the remaining numeric data read from the prepaid card by the reader/writer 17 and an indicator 19 for displaying an operating state of the sterilizing wet wiper supplying apparatus 1 of the embodiment 1 are disposed at lower positions on the front surface of the supplying apparatus 1. In addition, a proximity sensor 20 is disposed the vicinity of the discharge port 13 to sense the approach of a hand as a human body or other object by any mechanism such as by infrared rays. These components are preferably connected to the controller 16 as shown in FIG. 2.

The above components constituting the sterilizing wet wiper supplying apparatus 1 of the embodiment 1 are suitably connected as shown for example in FIG. 2, the electrolyte aqueous solution is discharged from the electrolyte aqueous solution bottle 3 into the receiving pail 4 so that it maintains a prescribed water level, it is sensed by the drop of the water level that the electrolyte aqueous solution bottle 3 is made empty and this is displayed on the indicator 19 through a lamp being lit. The electrolyte aqueous solution discharged into the receiving pail 4 is supplied to the electrolyzer 6 by the fixed quantity discharge pump 6 through the flow passages 5, 7.

As shown for example in FIG. 3, the electrolyzer 8 of the embodiment 1 suitably has such a structure that an anode plate 31 is disposed in a cabinet 26 formed of any suitable material such as vinyl chloride and two cathode plates 30 are disposed on both the sides of the anode plate 31 at prescribed intervals and the electrolyte aqueous solution flows between the anode plate 31 and the cathode plates 30 so that it is electrolyzed.

Any material can be used to these electrode plates 30, 31 so long as it has a sufficient resistance to corrosion without being eluted even if a high voltage is imposed thereon in electrolysis, sufficient conductivity and suitable mechanical strength and its price is practically employable. A titanium plate, a platinum-clad titanium plate, a graphite plate, a ferrite plate and the like for example can be used as the material for the electrode plates.

In the embodiment 1, nickel simple ferrite is used as the anode plate 31 because it is excellent in a specific resistance, corrosion resistance, shock resistant strength and the like. The nickel simple ferrite can be obtained for example, by mixing nickel oxide as a divalent metal compound and ferric oxide at a prescribed ratio and baking the mixture under a suitable atmospheric condition. Further, although the titanium plate is used as the cathode plates 30, the same material may be used to the anode plate 31 and the cathode plates 30.

Since the nickel simple ferrite has a high corrosion resistance particularly against a high voltage imposed thereon, it is preferably used to electrolyze fresh water such as tap water and the like having low conductivity.

The respective electrode plates 30 and 31 are inserted into inserting portions 29 formed in the cabinet 26 so that they are disposed at the prescribed intervals. When the intervals between the electrode plates are too large, the voltage imposed between the electrode plates is increased and the power supply required is increased and thus is made expensive; whereas when the intervals are too small, the throughput of the electrolyte aqueous solution processed by the electrolyzer 8 is reduced. Thus, the intervals are preferably set within a range of 1–10 mm and more preferably within a ranged of 3–6 mm. In the embodiment, the intervals are set to 6 mm.

The opening of the cabinet 26 at an end thereof is covered with a suitable lid such as a vinyl chloride lid 27 which is fixed thereto by conical screws 35 through a packing 28. The respective electrode plates 30, 31 are provided with electrode terminals 32, 33 which are exposed to the outside of the cabinet 26 through the holes 36, 37 formed to the lid 27. These electrode terminals 32, 33 are fixed to the lid 27 through O-rings, circular washers and stainless steel nuts. A constant current power supply 21 accommodated in the controller 16 is connected to the electrode terminals 32, 33 as shown in FIG. 2 to thereby supply a prescribed current thereto. The flow passage 7 communicating with the fixed quantity discharge pump 6 is connected to an inlet joint 34 which is disposed at a lower position of the lid 27 and communicates with the interior of the cabinet 26. Electrolysis is carried out to the electrolyte aqueous solution supplied from below the respective electrode plates 30, 31. Then, the electrolyzed water is discharged to the flow passage 9 from an outlet joint 38 disposed at an upper position of the lid 27 and supplied to the supply nozzle 10.

The electrolyzed water supplied to the supply nozzle 10 is discharged from the discharge ports 23 thereof in an approximately constant amount as shown in FIG. 1 and FIG. 2 as well as the guide rollers 11, 12 disposed at the prescribed positions above and below the supply nozzle 10 are rotated at an approximately constant speed by drive motors 24, 25 to thereby supply the absorbent base material 14 to the supply nozzle 10 at an approximately constant speed. As a result, the absorbent base material 14 can be approximately uniformly impregnated with the electrolyzed water without unevenness.

The use of the above-described impregnating means is preferable because it not only approximately uniformly impregnates only the portion of the absorbent base material 14 having been supplied by guide rollers 11, 12 with the electrolyzed water in a necessary and sufficient amount, but also suitably controls the impregnated state of the absorbent base material 14 by regulating the speed at which the absorbent base sheet 14 is supplied and the amount of the electrolyzed water discharged. However, the present invention is not limited to the above impregnating means and other impregnating means, for example, impregnating means employing simple dipping and the like may be used. Furthermore, the guide rollers may be driven by other mechanisms, for example, by human power and the electrolyzed water may be alternatively supplied for example, in association with the thus driven rollers.

The controller 16 for controlling the operations of the respective components can be arranged for example as shown in FIG. 4 and includes therein a constant current power supply 21 for imposing a prescribed constant current on the electrolyzer 8, a motor control I/F unit 40 for controlling the operations of the drive motors 24, 25 for driving the guide rollers 11, 12 and the operation of the motor of the fixed quantity discharge pump 6, a RAM 39 for temporarily storing the remaining numeric data and the like read from a prepaid card by the reader/writer 17, a ROM 48 for previously storing a prescribed control program and the like and an MPU 22 as a control unit for executing various arithmetic operations and the control program stored in the ROM 48 and controls the respective components. In the embodiment 1, the MPU 22 executes a determination operation for determining whether a sterilizing wet wiper is to be supplied or not based on the remaining numeric data and subtraction means for calculating a renewed remaining numeric data by subtracting a prescribed value from the above remaining numeric data when the sterilizing wet wiper is supplied based on a prescribed determination program and subtraction program.

An operation of the sterilizing wet wiper supplying apparatus 1 of the embodiment 1 will be described below. First, when the user confirms that a lamp indicating that the apparatus 1 is in operation is lit in the indicator 19, he or she inserts a prepaid card in which a prescribed remaining numeric data is stored into the reader/writer 17.

The reader/writer 17 reads out the remaining numeric data stored in the prepaid card based on the insertion thereof and outputs the data to the MPU 22 so that it is temporarily stored in the RAM 39.

Although data of the available number of sterilizing wet wipers is stored as the remaining numeric data in the embodiment 1, the present invention is not limited thereto and the remaining numeric data may be other data such as, for example, data of an amount of money, point data and the like. Instead of a prepaid card, the data can be based within the apparatus itself or be based on other data.

Next, the MPU 22 determines whether the remaining numeric data read from the prepaid card is 1 or more based on the above prescribed determination program. When the remaining numeric data is 1 or more, the MPU 22 determines that a sterilizing wet wiper can be supplied, whereas when the remaining numeric data is less than 1, the MPU 22 determines that the sterilizing wet wiper cannot be supplied and discharges the prepaid card from the reader/writer 17.

When it is determined from the above determination that the sterilizing wet wiper can be supplied, the MPU 22 displays the remaining numeric data on the display unit 18.

The user puts his or her hand just below the discharge port 13 of the sterilizing wet wiper based on the display on the display unit 18. When the user's hand is put just below the discharge port 13, the proximity sensor 20 senses the hand and outputs a signal to the MPU 22.

The MPU 22 supplies a prescribed current to the electrolyzer 8 by operating the constant current power supply 21 based on the signal as well as supplies the electrolyte aqueous solution to the electrolyzer 8 by operating the fixed quantity discharge pump 6.

When the fixed quantity discharge pump 6 is operated, the electrolyzed water which has passed through the interior of the electrolyzer 8 and in which hypohalogenous acid having a sterilizing power has been created is discharged from the discharge ports 23 of the supply nozzle 10 at an approximately prescribed flow rate (suitably 90 ml/min. or about 90 ml/min.) and the MPU 22 rotates the guide rollers 11, 12 at an approximately prescribed constant speed through the drive motors 24, 25 in synchronism with the discharge of the electrolyzed water. As a result, the absorbent base material 14 is supplied from the supply drum 15 at an approximately constant speed to thereby permit the absorbent base material 14 to be approximately uniformly impregnated with the electrolyzed water.

The concentration of the hypohalogenous acid in the electrolyzed water created by the electrolyzer 8 is preferably 1 ppm or more and more preferably 20 ppm or more because if the concentration is too low, a sufficient sterilizing effect may be difficult to be obtained. The concentration of the hypohalogenous acid may be suitably selected in accordance with the tolerance of germs and the like to be sterilized and the portion, area and the like of a human body or other object to be sterilized. A current supply condition and the flow rate of the electrolyte aqueous solution may be determined in correspondence to the concentration. When the absorbent base material 14 supplied from the supply drum reaches a prescribed length (which is detected by the number of rotations of the guide roller 11), the MPU 22 stops the current supplied to the electrolyzer 8, the operation of the fixed quantity discharge pump 6 and the supply of the absorbent base material 14. Suitably the supply is capable of being operated for a period of 10 minutes, for example.

At this time, the lower end of the absorbent base material 14 impregnated with the electrolyzed water goes out of the apparatus 1 through the discharge port 13. When the user pulls down the lower end, the absorbent base material 14 is torn along a perforated tear line formed thereto at prescribed intervals so that the absorbent base material 14 having the prescribed length is supplied as a sterilizing wet wiper; alternatively any other mechanism for discharging the impregnated wiper can be used as well.

At the time, since the hand of the user leaves the vicinity of the discharge port 13, the proximity sensor 20 does not sense the hand and outputs a signal to the MPU 22. The MPU 22 subtracts "1" as the prescribed numeric value from the remaining numeric data temporarily stored in the RAM 39 based on the prescribed subtraction program and stores a renewed remaining numeric data to the RAM 39.

When the user desires to be supplied with another sterilizing wet wiper again, he or she can be supplied with it by approaching his or her hand to the vicinity of the discharge port 13 again when a sufficient amount of sterilizing wet wipers remain.

When the user desires to finish the supply of the sterilizing wet wiper, he or she presses a finish button disposed to the display unit 18, whereby the renewed remaining numeric data stored to the RAM 39 is written to the prepaid card by the reader/writer 17 and the prepaid card is discharged.

When the embodiment 1 is arranged as described above, since the hypohalogenous acid in the electrolyzed water with which the absorbent base material is impregnated not only has a high sterilizing power but also is decomposed instantly when it comes into contact with a human body and the like and returns to an original electrolyte aqueous solution containing a halide, the substance having the sterilizing power does not remain in the skin and the like of a human body and does not cause rough skin even if it is used for a long time.

Since hypohalogenous acid is decomposed as time elapses after it is created due to the easily—decomposing property thereof, it is preferable to execute electrolysis in synchronism with a timing at which a sterilizing wet wiper is supplied and impregnate the wet wiper with electrolyzed water obtained by the electrolysis, inter alia, because this method permits the hypohalogenous acid created in the electrolysis to be supplied without being decomposed.

Figure 6:
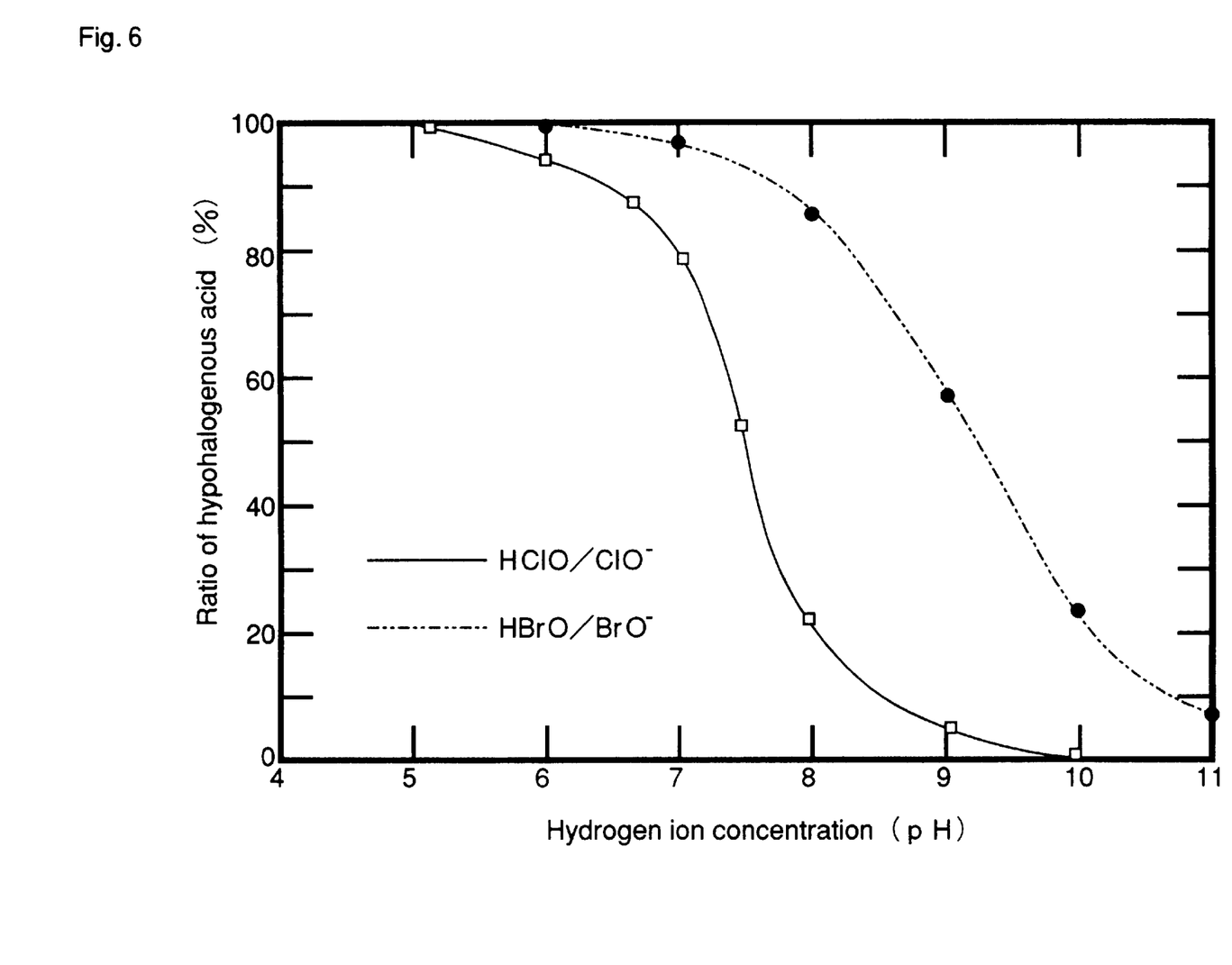
FIG. 6 is a graph showing the relationship between the pH of electrolyzed water and the existing ratio of hypohalogenous acid and hypohalogenous acid ions.

However, the present invention is not limited thereto. The chloride ions made from sodium chloride and bromide ions made from sodium bromide, and the like are mentioned as suitable halogen ions supplied by the above halide in the embodiment 1. However, hypochlorous acid and hypobromous acid created by the electrolysis executed in the electrolyzer 8 partly exist by being changed to hypochlorous acid ions and hypobromous acid ions in accordance with the hydrogen ion concentration (pH) of electrolyzed water as shown in FIG. 6, as such, and there is a tendency that the existing ratio of hypochlorous acid ions and hypobromous acid ions is increased by an increase of pH.

The hypochlorous acid ions and hypobromous acid ions are inferior in a capability for creating free radical oxygen which serves as a source of the sterilizing power and have a sterilizing power which is greatly lower than that of hypochlorous acid and hypobromous acid. Therefore, it can be found that when the pH of electrolyzed water increases as described above, there is a tendency that the existing ratio of the hypochlorous acid and hypobromous acid in the electrolyzed water to be lowered and the sterilizing power of the electrolyzed water is also lowered so that the sterilizing power of the created electrolyzed water is greatly changed depending upon the change of the pH thereof.

Figure 7:
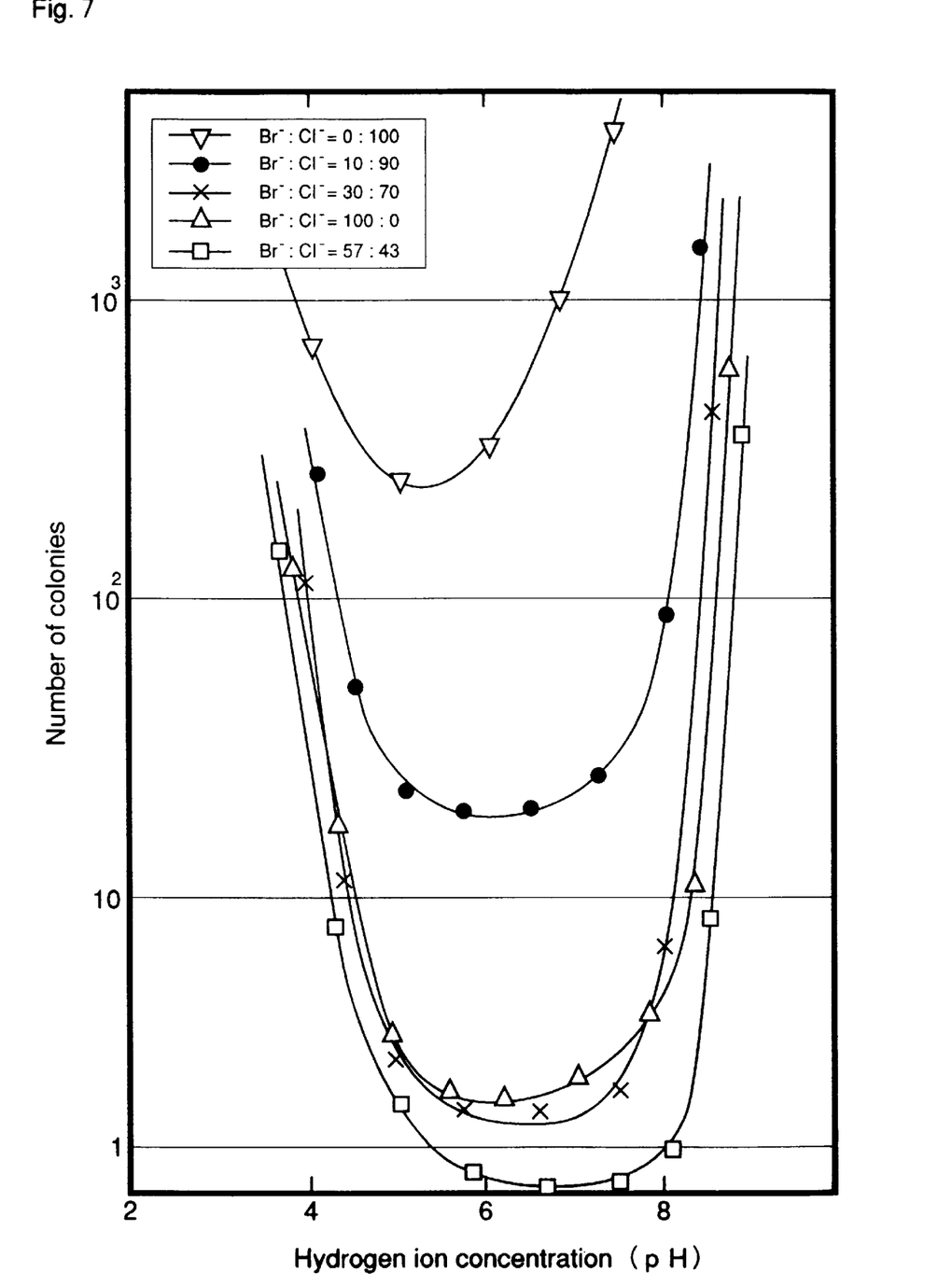
FIG. 7 is a graph showing the relationship between respective pHs and a sterilizing power when the chlorine ions and bromine ions in an electrolyte aqueous solution can suitably be set to respective prescribed ratios.

To cope with problem, a sterilizing power was tested by setting the concentration of hypohalogenous acid to be created to a prescribed constant value and changing the ratio of chlorine ions and bromine ions in an electrolyte aqueous solution. FIG. 7 shows a result of the test.

The concentration of hypohalogenous acid was set to about 1 mg/liter in chlorine terms, a liquid temperature was set to 20° C. as test conditions, electrolyzed waters containing chlorine ions and bromine ions at respective ratios were prepared, the hydrogen ion concentrations (pH) of the electrolyzed waters were adjusted to respective pHs using hydrochloric acid as inorganic acid or sodium hydroxide, a germ liquid containing ordinary viable germs of a prescribed concentration was added in a prescribed amount to and mixed with the electrolyzed waters, a processing time was set to about 10 seconds, the mixtures of the electrolyzed waters and the germ liquid were taken out after about 10 seconds, the viable germs in the mixtures were cultured under the same conditions and then the number of colonies in each of the mixtures was counted.

It can be found from the result shown in FIG. 7 that when an electrolyzed water containing simple chlorine ions is used and the pH thereof exceeds 6 within the range of pH 5.8–8.6, that is, the reference pH of tap water which is not supposed to adversely affect a human body and skin, the sterilizing capability of the electrolyzed water is greatly reduced as well as the sterilizing power thereof is low. On the contrary, it can be found that not only an electrolyzed water containing simple bromide ions provides a sterilizing power higher than that of the electrolyzed water containing the simple chlorine ions in the range of pH 5.8–8.6 but also the sterilizing power thereof is stable.

Further, it can be found that when the chlorine ions and bromine ions are suitably mixed in electrolyzed water, the sterilizing power thereof can be more increased than that of the electrolyzed water containing the only simple bromine ions, and in particular, when the ratio of chlorine ions and bromine ions is set to from 30:70 to 70:30, more preferably from 40:60 to 60:40, most preferably at a ratio of chlorine to bromine is about 43:57 or exactly 43:57, an approximately constant high sterilizing power can be obtained in the entire range of pH 5.8–8.6.

It suffices only to select a ratio of chlorine ions and/or bromine ions to be used from a required sterilizing power, a pH of electrolyzed water, and the like taking the above mentioned into consideration.

Although the electrolyte aqueous solution bottle 3 stores an electrolyte aqueous solution in which a halide of a prescribed concentration is dissolved in the embodiment 1, the present invention is not limited thereto. That is, service water or the like may be put into the bottle and a halide may be suitably added thereto. Further, when created hypohalogenous acid is permitted to have a relatively low concentration, service water such as tap water or the like may be supplied to the electrolyzer 8, for example when nickel ferrite is used as the anode 31 of the electrolyzer 8 in the embodiment 1. When fresh water such as service water or the like is used, it is preferable that the concentration of chlorine ions in the tap water is at least 5 ppm and the conductivity thereof is 100 i±s/cm or more.

Although the prepaid card in which the remaining numeric data is magnetically stored is used as a portable recording medium in the embodiment 1, the present invention is not limited thereto and the recording medium may be a magnetic card and the like such as a consultation card, a member card and the like. In addition, the recording medium may be a recording medium other than the magnetic card such as an IC card and the like.

Further in a system of the embodiment 1, the proximity sensor can sense the approach of a hand by infrared rays which is convenient and sanitary and thus preferable because the system permits the user to discharge a sterilizing wet wiper without touching a button with his or her hand. However, the present invention is not limited thereto and the discharge of the sterilizing wet wiper may be started when a button is pressed or any other method may be used. Further, a sensor other than the infrared ray sensor may be used, such as a non-contact sensor.

(Embodiment 2)

Figure 5:
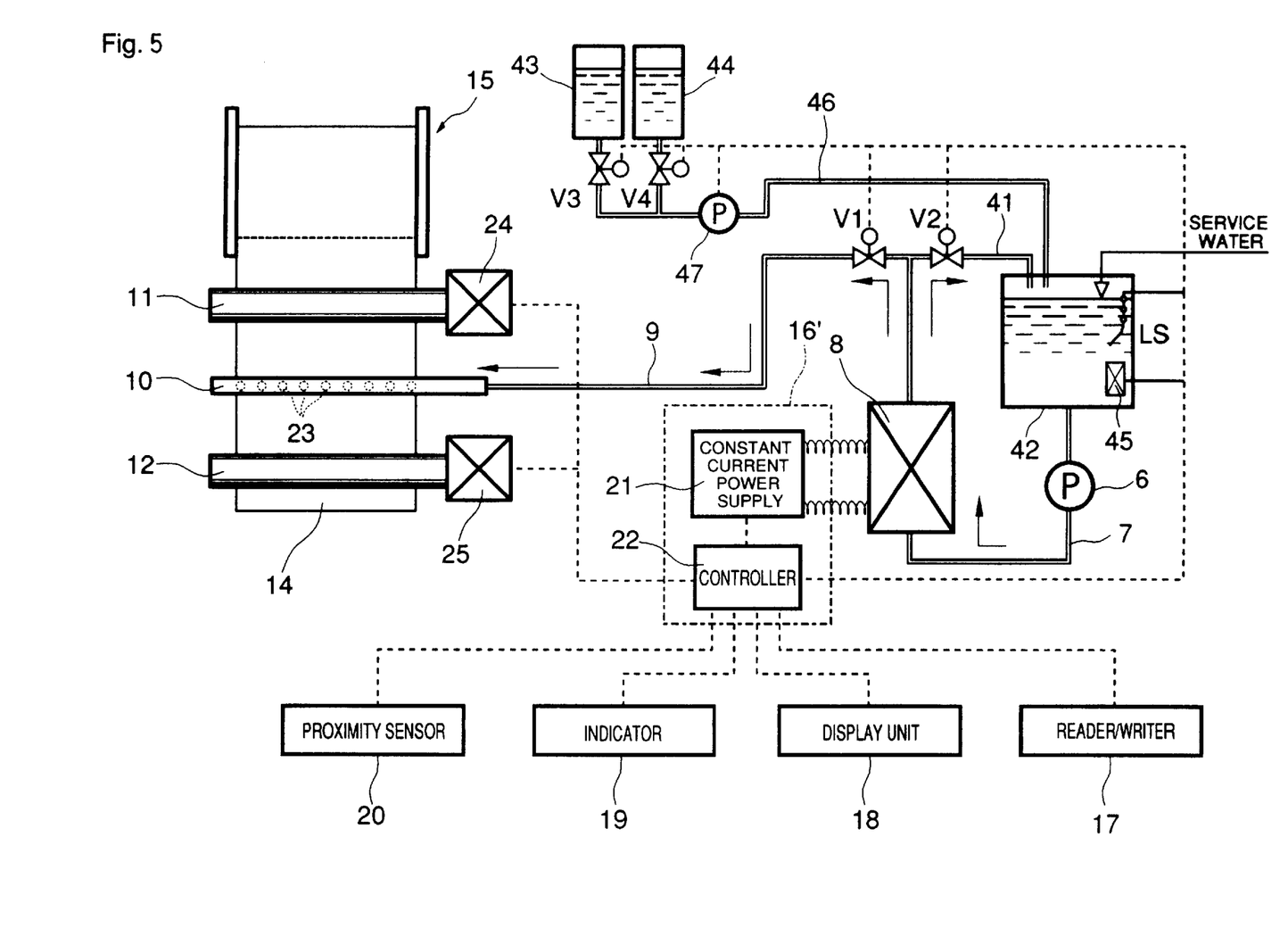
FIG. 5 is a flow and block diagram showing an arrangement of a sterilizing wet wiper supplying apparatus in an embodiment of the present invention.

FIG. 5 is a flow and block diagram showing an arrangement of a sterilizing wet wiper supply apparatus of an embodiment 2.

As shown for example in FIG. 5, the sterilizing wet wiper supply apparatus of the embodiment 2 can be arranged similarly to that of the embodiment 1. However, the apparatus has such a feature that tap water as service water can be supplied thereto, a storage tank 42 capable of storing the service water is provided in place of the above electrolyte aqueous solution bottle 3, a return passage 41 is branched from a flow passage 9 communicating with a supply nozzle 10 and disposed downstream of an electrolyzer 8 to return electrolyzed water to the storage tank 42. The flow passage 9 and the return passage 41 are provided with electromagnetic valves Vi, V2, respectively which are opened and closed by a controller 16'.

A pH sensor 45 is disposed in the storage tank 42 to sense the pH of service water or electrolyzed water stored therein as well as an acid tank 43 for storing an inorganic acid aqueous solution of a prescribed concentration such as sulfuric acid, phosphoric acid or the like, an alkali tank 44 for storing a sodium hydroxide aqueous solution of a prescribed concentration and a supply pump 47 are disposed. When the pH measured by the pH sensor 45 exceeds the range of 5.8–8.6, electromagnetic valves V3, V4 disposed below the acid tank 43 and the alkali tank 44 are suitably opened and closed by the controller 16' to thereby supply acid or alkali to the storage tank 42 through a flow passage 46 50 that the pH of the electrolyzed water in the storage tank 42 is maintained within the range of 5.8–8.6.

A timer (not shown) is preferably disposed in the controller 16' of the embodiment 2 so that the excessive increase and decrease of the concentration of hypohalogenous (chloride) acid in the electrolyzed water are prevented by intermittently electrolyzing the electrolyzed water circulating between the electrolyzer 8 and the storage tank 42 at predetermined intervals.

Although the concentration of hypohalogenous (chloride) acid in the electrolyzed water can be controlled by controlling an operation time by the timer in the embodiment 2, the present invention is not limited thereto and the concentration of hypohalogenous (chloride) acid in the electrolyzed water may be controlled by sensing it by a sensor so that it is maintained to an approximately constant concentration.

An operation of the sterilizing wet wiper supply apparatus of the embodiment 2 will be described, putting an operation different from that of the embodiment 1 into focus. First, in the embodiment 2, water is previously supplied to the electrolyzer 8 and electrolyzed water is circulated between the storage tank 42 and the electrolyzer many times 8 through the return passage 41 to thereby store electrolyzed water having a high hypohalogenous (chlorine) acid concentration in the storage tank 42, in contrast to the sterilizing wet wiper supply apparatus of the embodiment 1 which preferably only supplies water to the electrolyzer 8 when the absorbent base material is impregnated with electrolyzed water.

When the hand of the user is sensed by a proximity sensor 20, the electromagnetic valve Vi disposed to the flow passage 9 communicating with the supply nozzle 10 is opened and the electromagnetic valve V2 disposed to the return passage 41 is closed to thereby supply the electrolyzed water, which is stored in the storage tank 42, contains hypohalogenous (chlorine) acid of a prescribed concentration and has a pH within the range of 5.8–8.6, to the supply nozzle 10 through the flow passage 9 and discharges it from discharge ports 23 approximately constantly so that the absorbent base material 14 is uniformly impregnated with the electrolyzed water.

When the apparatus is arranged as described in the embodiment 2, even if tap water having a low halogen ion concentration and low conductivity is used, electrolyzed water having a relatively high hypohalogenous acid concentration can be created from the tap water having the low halogen ion concentration by supplying the electrolyzed water to the electrolyzer 8 a plurality of times by the above circulation.

While the present invention has been described based on the drawings, the present invention is by no means limited to the above embodiments and it goes without saying that modifications and additions within a range which does not depart from the gist of the present invention can be included in the present invention.

Although sodium chloride and sodium bromide are exemplified as a halide in the respective embodiments, the present invention is not limited thereto and a halide of other alkaline metal, for example, kalium, lithium, etc. and magnesium, calcium, etc. as alkaline earth metal may be used and they may be suitably selected depending upon the price and the like of the halide.

The absorbent base material in the present invention can be any suitable material, for example, paper, non-woven fabric, cotton wool, rayon staple cotton and/or these materials combined with a plastic film. The base material can be any material capable of being impregnated with electrolyzed water and the shape thereof is not limited to a continuous sheet as disclosed in the above embodiments and any arbitrary shape may be used.

The present invention can achieve the following advantages.

(a) According to one aspect of the invention, the hypohalogenous acid in the electrolyzed water with which the absorbent base material is impregnated has a high sterilizing power at a low concentration as well as is decomposed to water and halogen ions which are harmless to a human body and the like when they come into contact with them. Accordingly, even if the hypohalogenous acid is used for a long time, it is resistant to rough skin and the like without remaining in the human body.

(b) According to another aspect of the invention, since the pH of electrolyzed water is set to an approximately neutral region of pH 5.8–8.6 which is the reference pH of service water, the stimulation of skin and the like caused by acidity and alkalinity can be reduced.

(c) According to another aspect of the invention, a stable and high sterilizing power can be obtained at a pH 5.8–8.6.

(d) According to another aspect of the invention, since ordinary service water can be used without the need of addition, replenishment and the like of halogen ions, a sterilizing wet wiper can be supplied at a low price.

(e) According to another aspect of the invention, since the hypohalogenous acid in the electrolyzed water with which the absorbent base material is impregnated has a high sterilizing power at a low concentration as well as is decomposed to water and halogen ions which are harmless to a human body and the like when they come into contact with them, the hypohalogenous acid does not remain to the human body. Accordingly, there can be supplied a sterilizing wet wiper which is resistant to rough skin without the hypohalogenous acid remaining in the human body even if it is used for a long time.

(f) According to another aspect of the invention, it is preferable to impregnate the absorbent base materials with the electrolyzed water one after another in response to requests for supplying sterilizing wet wipers particularly in view of the property of the hypohalogenous acid in the electrolyzed water that it is decomposed as a time elapses when it comes into contact with air and the concentration thereof is lowered. According to this means, there can be supplied a sterilizing wet wiper having a high hypohalogenous acid concentration, whereby an excellent sterilizing power can be obtained.

(g) According to another aspect of the invention, since the pH of the electrolyzed water with which the absorbent base material is impregnated is in the neutral region of 5.8–8.6 at all times, the stimulation of skin and the like caused by acidity and alkalinity can be reduced.

(h) According to another aspect of the invention, the above ferrite has sufficient durability even if a high voltage is imposed thereon and can directly electrolyze service water and the like having low conductivity without the addition of halogen ions and make it to electrolyzed water containing hypohalogenous acid.

(i) According to another aspect of the invention, electrolyzed water containing highly concentrated hypohalogenous acid can be made by executing electrolysis a plurality of times.

(j) According to another aspect of the invention, not only a large amount of the absorbent base material can be accommodated but also only the portion of the base material having been supplied can be effectively impregnated with the electrolyzed water.

(k) According to another aspect of the invention, the entire base material having been supplied can be approximately uniformly impregnated with an approximately prescribed amount of the electrolyzed water by a simple mechanism.

(l) According to another aspect of the invention, since only a person having a recording medium in which a prescribed remaining numeric data is stored can be supplied with a sterilizing wet wiper, a sterilizing wet wiper is not supplied unnecessarily.

(m) According to another aspect of the invention, a sterilizing wet wiper can be automatically supplied when the proximity sensor senses the approach of a hand.

The Priority Document Japanese Patent Application No. 10-255954 filed Aug. 26, 1998 including the title, specification, figures, claims and abstract, is incorporated herein in its entirety by reference.

As used herein and in the following claims, singular articles such as "a", "the" and "an" can denote the singular or plural of the object which follows.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A sterilizing wet wiper, comprising:
   an absorbent skin wiping base material that is disposed outside of a liquid environment and is impregnated with electrolyzed water containing hypohalogenous acid to form said sterilizing wet wiper.

2. A sterilizing wet wiper according to claim 1, wherein the electrolyzed water, has a hydrogen ion concentration (pH) of 5.8–8.6.

3. A sterilizing wet wiper according to claim 2, wherein the halogen ions comprise chlorine ions and bromine ions mixed at a prescribed mixing ratio.

4. A sterilizing wet wiper according to claim 1, wherein the electrolyzed water is prepared from fresh water containing at least 5 ppm of chlorine ions and having conductivity of at least 100 $\mu$s/cm.

5. An apparatus for supplying sterilizing wet wipers comprising:
   a device for creating electrolyzed water containing hypohalogenous acid, said device including a supplier that supplies water containing at least halogen ions between an anode plate and cathode plates, and an electrolyzer that electrolyzes the water;
   an impregnator that impregnates an absorbent base material with the electrolyzed water supplied from said electrolyzed water creating device; and
   an opening through which at least a part of said base material, impregnated with the electrolyzed water, is removed from said apparatus.

6. A sterilizing wet wiper supply apparatus according to claim 5, further comprising:
   a supply that supplies said base material outside of the apparatus after said impregnator impregnates the absorbent base material with the electrolyzed water.

7. A sterilizing wet wiper supply apparatus according to claim 5, further comprising a control for maintaining the pH of the electrolyzed water from 5.8–8.6.

8. A sterilizing wet wiper supply apparatus according to claim 5, wherein at least an anode in said electrolyzed water creating device comprises ferrite and said electrolyzed water creating device further comprises a service water supply port capable of supplying water.

9. A sterilizing wet wiper supply apparatus according to claim 8, wherein said electrolyzed water creating device further comprises a circulation passage to permit water to be electrolyzed at least two times.

10. A sterilizing wet wiper supply apparatus according to claim 5, wherein the absorbent base material is a rolled continuous sheet.

11. A sterilizing wet wiper supply apparatus according to claim 10, wherein said base material is a continuous sheet, and wherein said impregnation means comprises:
    a base material supply unit for supplying the base material at an approximately constant speed; and
    a supply nozzle for discharging the electrolyzed water supplied from said electrolyzed water creating device to the base material in an approximately constant discharge amount.

12. A sterilizing wet wiper supply apparatus according to claim 5, further comprising:
    a read/write unit for reading numeric data corresponding to remaining capability of said apparatus to supply sterilizing wet wipers, from a portable recording medium;
    determination means for determimng whether a sterilizing wet wiper can be supplied or not from the numeric data; and
    subtraction means for subtracting a prescribed numeric value from the data when a sterilizing wet wiper is supplied from the apparatus, and
    wherein renewed numeric data is obtained by subtracting the prescribed numeric value and stored to the recording medium.

13. A sterilizing wet wiper supply apparatus according to claim 5, further comprising:
    a supply port through which said absorbent base material is supplied; and
    a proximity sensor disposed in the vicinity of said supply port to sense the approach of a body or object accepting said wet wiper.

14. A method of providing sterile wet wipers, which comprises the steps of:
    providing an absorbent base material in a container;
    electrolyzing a supply of water containing halogen ions by providing said supply of water between anode and cathode plates, thereby producing electrolyzed water containing hypohalogenous acid; and
    impregnating said absorbent base material in said container with said electrolyzed water after said electrolyzing step.

15. A method according to claim 14, which further comprises the step of:
    maintaining said electrolyzed water at a pH of 5.8–8.6 before said impregnating step.

16. A method according to claim 14, wherein said halogen ions in said supply of water comprise chlorine ions and bromine ions at a prescribed mixing ratio.

17. A method according to claim 14, wherein said supply of water is fresh water containing at least 5 ppm of chlorine ions and having a conductivity of at least 100 $\mu$s/cm.

18. A method according to claim 14, which further comprises the step of:

supplying said absorbent base material outside of said container after said impregnation step.

19. A method according to claim 14, which further comprises the steps of:

circulating said electrolyzed water in said container; and re-electrolyzing said electrolyzed water by providing said electrolyzed water between said anode and cathode plates.

20. A method according to claim 14, wherein said absorbent base material is provided using a supply unit that supplies the absorbent base material at an approximately constant speed.

21. A method according to claim 14, wherein said impregnating step includes discharging said electrolyzed water through a supply nozzle and onto said absorbent base material.

22. A method according to claim 14, which further comprises:

automatically reading numeric data corresponding to a remaining supply of said base material using a read/write unit of a recording medium;

automatically determining whether another sterile wet wiper can be supplied based on said numeric data;

automatically subtracting a prescribed numeric value from said numeric data when a first sterile wet wiper is supplied from the container; and renewing the numeric value by storing the subtracted prescribed numeric value in the recording medium.

\* \* \* \* \*